Jan. 24, 1950    D. CANADY    2,495,442
FILM TRANSMISSION MECHANISM
Filed May 21, 1945    2 Sheets-Sheet 1
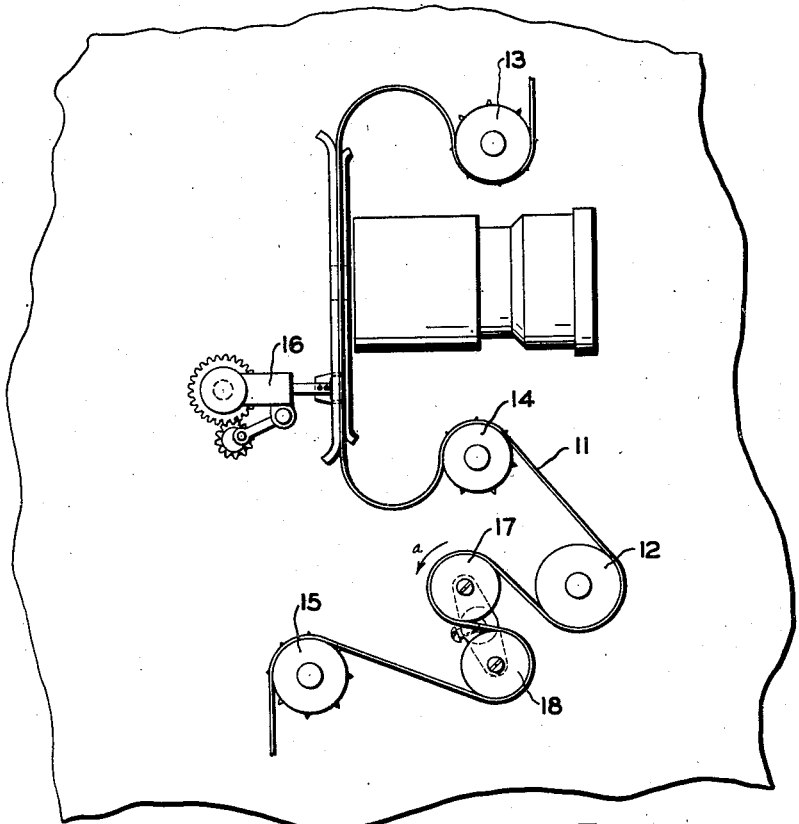
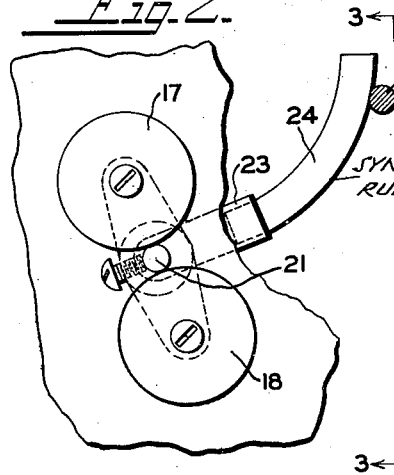
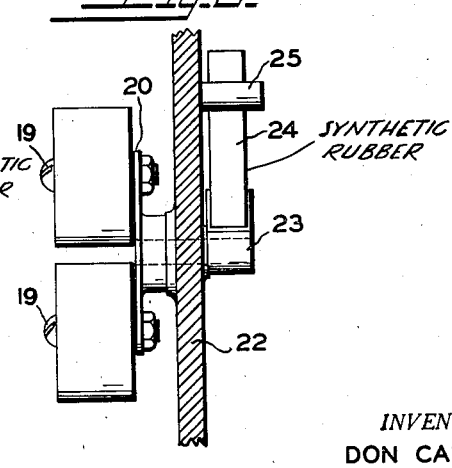
INVENTOR.
DON CANADY
BY
*H. C. Karel.*
ATTORNEY Jan. 24, 1950     D. CANADY     2,495,442
FILM TRANSMISSION MECHANISM
Filed May 21, 1945     2 Sheets-Sheet 2
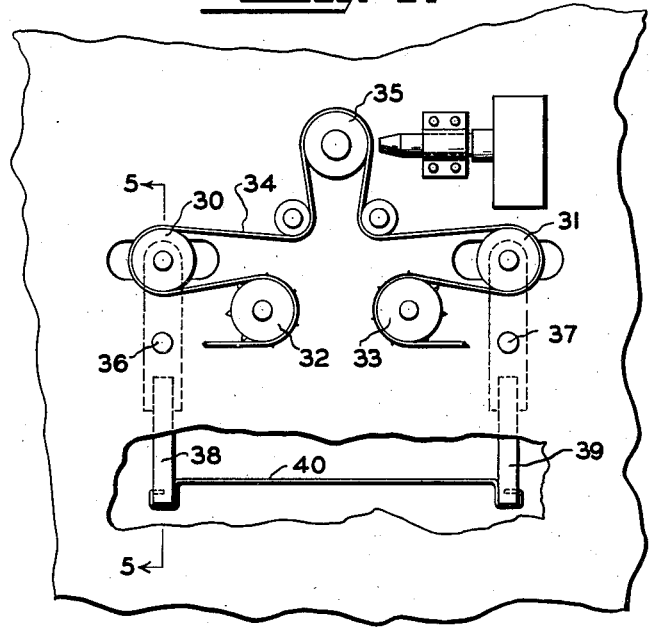
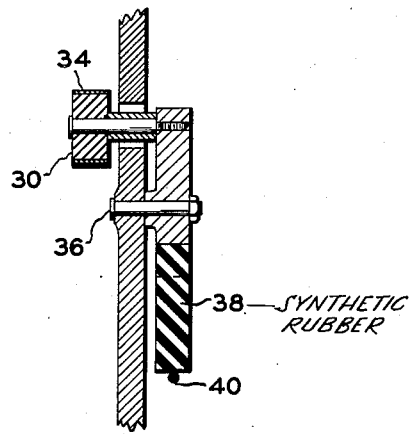
INVENTOR.
DON CANADY
BY
ATTORNEY Patented Jan. 24, 1950

2,495,442

UNITED STATES PATENT OFFICE 2,495,442

FILM TRANSMISSION MECHANISM

Don Canady, Cleveland, Ohio

Application May 21, 1945, Serial No. 594,977

1 Claim. (Cl. 271—2.3)

My invention relates to a device for maintaining a constant and uniform pressure on motion picture film, wire or ribbon on which sound is recorded as it travels over a sound or recording drum of a projector or recorder.

The film, wire or ribbon is usually fed over the sound drum by means of sprocket wheels, which in themselves, are not capable of drawing the film over the sound drum at a constant and uniform speed due to imperfections or shrinkage in the film. I am aware that various attempts have been made to compensate for such irregularities and such attempts have primarily consisted by providing take up rollers with spring tension applied thereto. Such devices have not been satisfactory due to the resilience of the springs which cause a fluttering of the rollers which impairs the sound.

I have found that I can accomplish perfect sound recording or transmission of the sound by employing take up rollers mounted in such a manner and having connected to the take up roller support, a member which will flex, which has no vibration in returning to its normal position. I have found that synthetic rubber is most adaptable for this purpose.

The object of my invention is to provide guide rollers mounted in a manner to permit the rollers to yield to maintain the film, wire or ribbon taut as it passes over the sound drum and to absorb any and all shocks that would normally affect the sound.

A further object is to provide dampening means for retarding the yielding action of the guide rollers.

My invention will be further readily understood from the following description and claim and from the drawings, in which latter:

Fig. 1 is a side view of a portion of a projector mechanism employing my improvement.

Fig. 2 is an enlarged detail of my improved take up roller mounting.

Fig. 3 is a vertical section of the same, taken in the plane of the line 3—3 of Fig. 2.

Fig. 4 is a side view of a portion of a recording mechanism showing a modified form of my invention; and, Fig. 5 is a detailed section of the same, taken in the plane of the line 5—5 of Fig. 4.

My improved mechanism is adapted to be used in connection with a sound recorder or reproducer to maintain a constant uniform travel of the film, wire or ribbon 11 over the sound drum 12. In the case of the projector, the film is constantly moved by means of sprocket wheels 13, 14 and 15, while the film is advanced past the projection aperture by means of an intermittent movement 16. This intermittent movement has a tendency to set up vibrations in the film and together with shrinkage and defects in the film, such as kinks and broken sprocket holes, causes the film to pass over the sound drum in a somewhat jerky manner which impairs the sound. Therefore, I provide a pair of rollers 17 and 18 rotatable on studs 19 which are supported on an arm 20 fixed to a shaft 21 which has a suitable bearing in the frame 22. Also secured to the shaft 22 is a supporting member 23 which has a piece of synthetic rubber 24 extending therefrom and bearing against a pin 25 secured in the frame to create a pressure on the rollers in the direction of the arrow $a$. Thus the rollers 17 and 18 create a constant pressure on the film for maintaining the film in a taut relation to the sound drum and any irregularities in the feeding of the film will cause the rollers to compensate for such irregularity by yielding under the tension of the member 24. However, any movement of the rollers away from their normal position under the influence of the member 24 will be slowly returned to their normal position without any vibration being set up in the rollers as does occur when a spring tension member is used.

In the modification shown in Figs. 4 and 5, a pair of separately mounted take up rollers 30 and 31 are shown to provide equalization between the driving sprockets 32 and 33 to feed the film 34 over the sound drum 35. In this form, the supporting arms of the rollers 30 and 31 are mounted on pivotable points 36 and 37 and have extending synthetic rubber strips 38 and 39 which are connected together by means of a clip 40. Thus either roller 30 or 31 can yield independent of each other or both rollers can yield to maintain the film in a taut condition over the sound drum 35. The clip 40 is so shaped to normally urge the rollers 30 and 31 into their normal position.

Having thus fully described my invention what I claim as new and desire to secure by Letters Patent, is:

A transmission mechanism for a sound carrying member, a sound drum, feed rollers on each side of said sound drum, a pair of rollers interposed between said sound drum and one of said feed rollers, a pivoted arm carrying said rollers, a flexible synthetic rubber member extending from said arm, a stop, said last named member bearing against said stop for normally urging said pair of rollers in a direction to maintain a tension on the sound carrying member over the sound drum between said feed rollers.

DON CANADY.

REFERENCES CITED

The following references are of record in the file of this patent:

UNITED STATES PATENTS

| Number | Name | Date |
| --- | --- | --- |
| 1,892,554 | Kellogg | Dec. 27, 1932 |
| 2,082,456 | Liedtke et al. | June 1, 1937 |
| 2,102,895 | Hasbrouck | Dec. 21, 1937 |
| 2,157,393 | Black | May 9, 1939 |

FOREIGN PATENTS

| Number | Country | Date |
| --- | --- | --- |
| 150,388 | Austria | Aug. 10, 1937 |
| 486,812 | Great Britain | June 10, 1938 |